Figure 1:
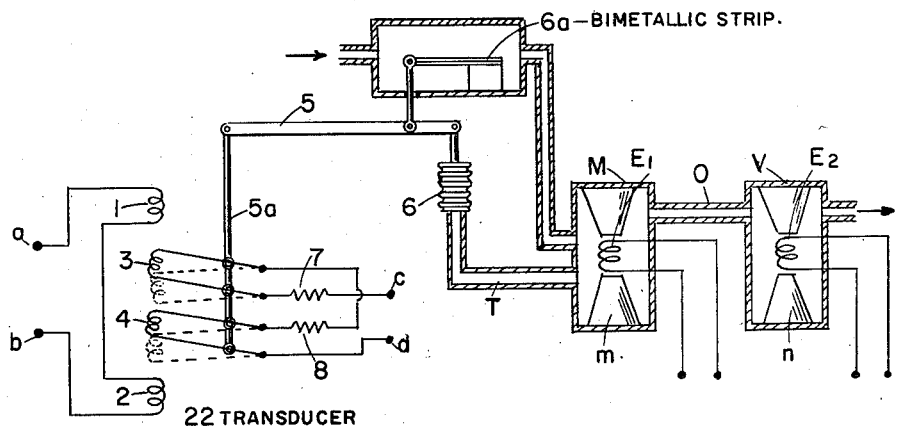

United States Patent Office 2,815,659
Patented Dec. 10, 1957

2,815,659

PRESSURE- AND TEMPERATURE-COMPENSATION IN MAGNETIC GAS ANALYSERS

Helmar M. Krupp, Frankfurt am Main, Germany, assignor to Hartmann & Braun Aktiengesellschaft, Frankfurt am Main, Germany, a corporation of Germany Application March 16, 1955, Serial No. 494,691

Claims priority, application Germany April 27, 1954

4 Claims. (Cl. 73—27)

The invention relates to devices for analysing gases by making use of their paramagnetism; the invention thus relates for instance and particularly to oxygen measuring devices. In these apparatuses an inhomogeneous magnetic field is produced within a measuring chamber which is fed with the gas to be examined. A heating element, particularly a heating wire, is placed on a spot of large inhomogeneity of the magnetic field, producing there a local heating. This gives rise to gas convection. If paramagnetic gases are present a further gas stream is produced which is superimposed to the heat convection and caused by changes of the paramagnetic property of gases in case these latter are heated. This gas stream is called "magnetic wind." In a comparison chamber fed with the same gas as the measuring chamber and containing also a heating element but being not exposed to a magnetic field only the natural heat convection occurs. The different cooling of the heating elements in both the chambers is measured, whereby the content of paramagnetic gas present in the mixture to be examined can be determined.

The indication of these devices, however, is influenced by the pressure and the temperature of the gas to be tested. In devices without zero suppression pressure- and temperature-variations are of influence only upon the sensitivity but not upon the position of the zero point. In devices with zero suppression, however, pressure- and temperature-variations also cause a shift of the origin of the scale.

It is the object of the invention to render the indication of magnetic gas analysers independent of pressure- and temperature-variations.

This according to the invention is effected by superimposing to the bridge supply current or to the measuring current or to both of them a current which depends upon the state of the gas. This superposed current, which changes according to the state of the gas, is generated by a device which may be used for correction of the sensitivity as well as of the shift of the scale origin (or any other point of the scale) or for the correction of both. It is therefore a versatile device which simplifies and unifies the arrangement in compensating circuits considerably. This is of special importance, since the dependability of the gas state is not the same for any range.

Thus for instance the variation of the indication caused by pressure variation is proportional to the $O_2$-content in the range from zero to, say, 50% $O_2$. In this range, therefore, the sensitivity of the device must be changed proportional to the pressure. This according to the invention is effected by superposing to the bridge supply current a current which depends upon the pressure. In the upper ranges, however, the variation in indication, due to pressure changes, practically does not depend upon the $O_2$-content; in this range, therefore, the correction must be additive. This is effected according to the invention by superposing to the indicating current a current which depends on the pressure. In the ranges between resp. if high accuracy is required both arrangements have to be employed.

Particularly in devices with suppressed zero point it is advisable to operate in the indicating circuit with an addtonal current, which depends on the pressure, since here the ranges mostly comprise high content of paramagnetic gas. In these devices there must be taken into consideration that even the scale origin depends on the state of the gas—in contrast to devices without suppressed zero point—and thus the invention is of special importance in these devices.

The invention may be described in detail by reference to the accompanying drawings 1–6, of which show Fig. 1 the device used for generating the pressure- and/or temperature-depending current, Fig. 2 a variation of the device shown in Fig. 1, Fig. 3 an arrangement according to the invention for the compensation of pressure- and/or temperature-influence upon the sensitivity, Figs. 4 and 5 circuits for correcting the shift of the scale origin due to variations in the gas state in devices with zero suppression, Fig. 6 a circuit for the compensation of changes in the sensitivity, within which a current is superimposed to the measuring current.

In Fig. 1 there is shown schematically a transducer generally designated 22, and pressure-temperature means 5, 6 and 6a, described in detail below responsive to the condition of gas which flows through measurement and comparison chambers M and V respectively. The chamber M is provided with a magnet $m$ to subject the gas therein to a magnetic field while the comparison chamber has no magnet, though it may have a dummy $n$ in the shape of the magnet. Each chamber is provided with like heater wires $E_1$ and $E_2$ respectively, $E_1$ being in the magnetic field and $E_2$ being in the comparison chamber. The two chambers are connected by a conduit O, so that gas passes from one to the other. To make up the transducer, two coils 1 and 2 are connected in series to the terminals $a$, $b$ across which they are fed by (generally constant) A.-C. Between coils 1 and 2 there are arranged two coils 3, 4. Coils 3, 4 have a fixed position to one another, indicated by the dotted line surrounding them. The currents induced in coils 3, 4 by the field of coils 1, 2 are connected in opposition, with two resistances 7, 8 interconnected. Thus the output $c$, $d$ delivers a current equal to the difference of said two currents. The output current depends on the position of coils 3, 4 in respect to coil 1, 2. Coils 3, 4 can be shifted jointly towards coil 1 or coil 2. This movement now occurs in dependence upon the pressure and/or temperature present in the gas to be tested. The bellows 6 alters the position of coils 3, 4 across the lever 5 and shift rod 5a according to the pressure present. The bellows is in communication with a chamber such as M via a tube T. The fulcrum of lever 5 may be moved by a bi-metallic strip 6a exposed to the gas. Securing the strip or the bellows against normal movement will result in a shift of the coils dependent on only pressure or temperature respectively. If it is desired to move coils 3, 4 in accordance with changes in pressure and temperature, then bellows and a bimetal strip may be allowed to actuate lever 5. Instead of this it also is possible to use bellows which are not completely evacuated, since the small amount of air then still present in the bellows renders the expansion of the bellows temperature-dependent.

Figure 2:
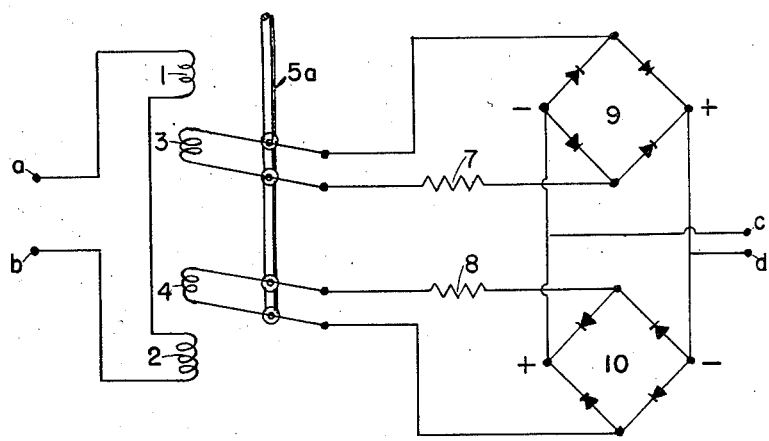

In case that D.-C. is required for the superposition of the bridge—resp. measuring-current (if namely the bridge is fed by D.-C.), than the arrangement shown in Fig. 2 is used. This arrangement differs from the one shown in Fig. 1 only in that the currents of coils 3, 4— before opposing them—are rectified by the full-wave rectifiers 9, 10. These rectifiers are connected by means of conductors 11, 12 as shown in the drawing. From the conductors 11, 12 the differential current is taken and led to the output terminals c, d. The resistances 7, 8 permit to give the output current any desired temperature dependability even if the movement of coils 3, 4 only depends on the pressure. You need only use resistances having a different and suited chosen dependence on temperature. In order to enable an adjustment of the device in that way that it delivers a predetermined current for a predetermined gas state the coils 1, 2 are movably mounted. In making the adjustment they are moved as required and thereafter fixed again. The sensitivity of the device may be adjusted too, either by changing the lever-ratio or by shunt resistances.

These devices, which may be called transducers, operate in the circuit described below to fullest satisfaction.

Figure 3:
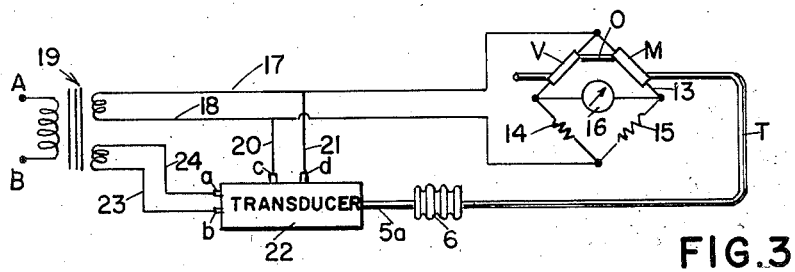

Fig. 3 shows an arrangement according to the invention for changing the sensitivity in accordance to pressure, it being understood that the temperature response means mentioned above also be used. For simplicity, the bellows 6 is shown to actuate the shift rod 5a of the transducer 22. Number 13 indicates the bridge circuit comprising measuring chammber M, comparison chamber V and two resistances 14, 15. Into the diagonal of the bridge the indicating instrument 16 is interconnected. The bridge is supplied across conductors 17, 18 by a constant voltage transformer 19. Eventually a rectifier is interconnected. A, B are the terminals of the transformer 19 across which it is connected to the A.-C. mains. By means of conductors 20, 21 the pressure and/or temperature dependent current is superimposed to the bridge supply current. The superimposed current is drawn from terminals c, d of the transducer 22 the details of the latter are not shown, since they correspond completely to those of Fig. 1. The transducer is fed across conductors 23, 24 by the same transformer which delivers the bridge current. The superposition of a current, which depends on the state of the gas, to the bridge supply current causes all measuring values to be increased or decreased by a constant factor, i. e. the sensitivity of the device is varied according to the state of the gas.

A variation of the scale origin, according to the pressure and/or temperature present, in devices with zero suppression is advantageously effected by influencing the measuring current (which flows through the indicating instrument), since therethrough a quantity, depending on the state of the gas, is added to any measuring value.

Figure 4:
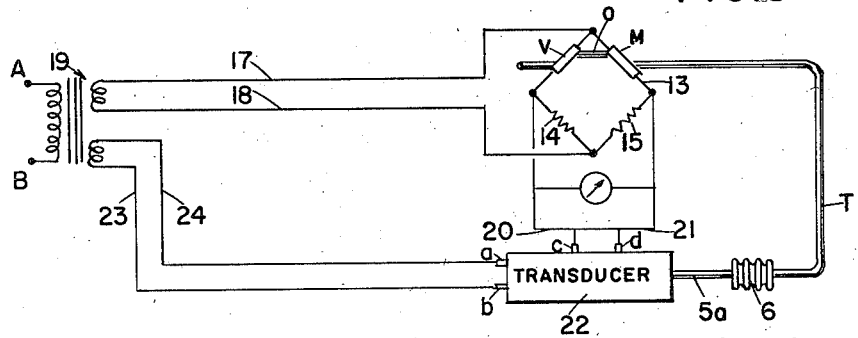
Figure 5:
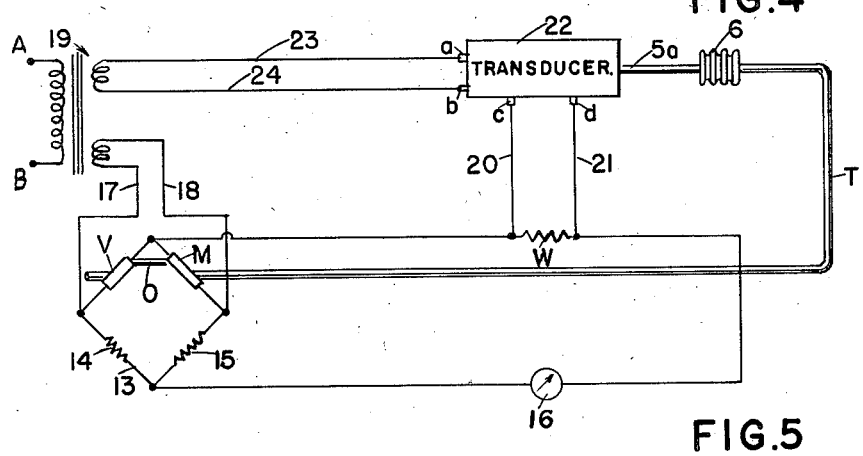
Figure 6:
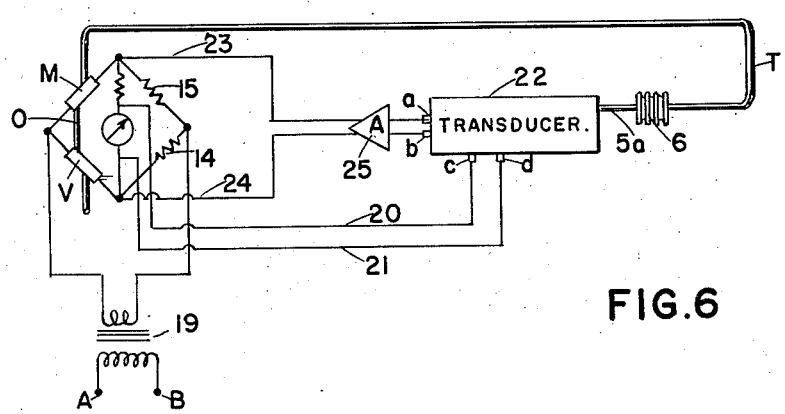

Figs. 4 and 5 show circuits suited for compensating the shift of the scale origin, which is caused by changes of the state of the gas, in devices with zero suppression. Figs. 4 and 5 correspond essentially to Fig. 3, the numbering also is the same; the current, however, delivered by the transducer and depending on the gas state is superimposed not to the bridge supply current, but to the measuring current.

In Fig. 4 the current from the transducer is led across the conductors 20, 21 immediately to the indicating instrument 16.

In Fig. 5 the output of the transducer is connected to a resistance W, which lies in series with the indicating instrument. Thus the indicating instrument is effected by the sum of measuring voltage and voltage drop across W.

A further possibility would be to use an indicating instrument with a moving system which consists of two coils, the one of which is fed with the measuring current, the other with the additional current from the transducer.

In the arrangement shown in Fig. 3 the variation in sensitivity had been compensated by influencing the bridge supply current. However, it is also possible to compensate these variations by directly influencing the measuring current. Fig. 6 shows a circuit suited for this purpose. The bridge and its circuit correspond to those shown in the preceding figures. A part of the measuring current is branched off by conductors 23, 24 and used for the supply of the transducer 22. It is led to the terminals a, b of the latter. Eventually the branch current is transformed into A.-C. and amplified (amplifier 25). The current leaving the transducer at the terminals c, d, therefore, not only depends on pressure and/or temperature but also on the content of paramagnetic gas present. Thus it is possible to lead it directly to the measuring instrument, this is effected by the conductors 20, 21:

I claim:

1. A gas analyser comprising two gas chambers connected to each other for an analysis gas to pass therethrough and each containing an electrical resistance heater element; a magnet for establishing an inhomogeneous field in one of two chambers; a Wheatstone bridge having two fixed resistors and in which the said elements are each connected together at a feed terminal of the bridge; a meter in a diagonal of the bridge for measuring the cooling of the heater in the chamber having said field due to magnetic wind generated thereby; a first set of two mutually fixed serially connected coils which are connected to the bridge diagonal; an amplifier and a transformer interposed between the coils and said diagonal; a second set of two coils movable with respect to said first set but fixed with respect to each other; means for shifting one set of coils with respect to the other set in accordance with the prevailing gas pressure in the chambers; a pair of full wave rectifiers connected together in opposition and each to a coil in the second set respectively for rectifying the differential of currents induced in the coils of the second set; and means connected to the bridge diagonal and to said rectifiers for delivering the rectified current into said diagonal to compensate the analyser for changes in the gas pressure in the chambers.

2. A gas analyser comprising two gas chambers connected to each other for an analysis gas to pass therethrough and each containing an electrical resistance heater element; a magnet for establishing an inhomogeneous field in one of two chambers; a Wheatstone bridge having two fixed resistors and in which the said elements are each connected together to a feed terminal of the bridge; a meter in a diagonal of the bridge for measuring the cooling of the heater in the chamber having said field due to magnetic wind generated thereby; a first set of two mutually fixed coils which are connected to the bridge diagonal; an amplifier and a transformer interposed between the coils and said diagonal; a second set of two coils movable with respect to said first set but fixed with respect to each other, the two sets of coils being inductively coupled; the nature of the coupling depending on their relative position, means for shifting one set of coils with respect to the other set in accordance with the prevailing gas pressure in the chambers; a pair of full wave rectifiers connected together and to the coils in the second set respectively for rectifying currents induced in the coils of the second set; and at least one resistor interposed between the rectifier and second set of coils, the output terminals of the rectifier being connected to those of the meter so that output voltage of the rectifiers is superimposed on the voltage at the meter for the purpose of compensating for gas pressure variations in the chambers.

3. A gas analyser comprising two gas chambers connected to each other for an analysis gas to pass therethrough and each containing an electrical resistance heater element; a magnet for establishing an inhomogeneous field in one of the two chambers; a Wheatstone bridge having two fixed resistors and in which the said elements are each connected together to a feed terminal of the bridge; a meter in a diagonal of the bridge for measuring the resistance of the heater in the chamber having said field; a first coil means and a source of alternating current connected thereto; a second coil means movable with respect to said first coil means and inductively coupled therewith; means for shifting one coil means with respect to the other coil means in accordance with the prevailing gas pressure in the chambers for altering the inductive coupling between said coil means; and means connected to the bridge and to said second coil means for delivering current therefrom to compensate the meter for changes in the gas pressure in the chambers.

4. An analyser as claimed in claim 3, the first mentioned means comprising a bellows in communication with one of the chambers and a lever pivotally connected to the bellows and second coil for transmitting motion of the bellows to the second coil.

References Cited in the file of this patent

UNITED STATES PATENTS

| | | |
|---|---|---|
| 2,251,751 | Minter | Aug. 5, 1941 |
| 2,472,645 | Clark | June 7, 1949 |
| 2,474,618 | Divoll | June 28, 1949 |
| 2,536,198 | Matner | Jan. 2, 1951 |

FOREIGN PATENTS

| | | |
|---|---|---|
| 712,762 | Germany | Oct. 24, 1941 |
| 288,197 | Switzerland | May 1, 1953 |

OTHER REFERENCES

Article: Principles and Applications of Oxygen Analyzers, by Riggs, published in Instruments, vol. 26, February 1953, pages 280–286.